(12) United States Patent
Severinsson (10) Patent No.: US 7,097,011 B2
(45) Date of Patent: Aug. 29, 2006

(54) PARK LOCK ACTIVATED BY FLUID

(75) Inventor: Lars Severinsson, Hishult (SE)

(73) Assignee: Haldex Brake Products AB, (SE)

( * ) Notice: Subject to any disclaimer, the term of this patent is extended or adjusted under 35 U.S.C. 154(b) by 0 days.

(21) Appl. No.: 11/028,988

(22) Filed: Jan. 4, 2005

(65) Prior Publication Data

US 2005/0179315 A1    Aug. 18, 2005

Related U.S. Application Data

(63) Continuation of application No. PCT/SE03/001093, filed on Jun. 26, 2003.

(30) Foreign Application Priority Data

Jul. 4, 2002    (SE)    .................................... 0202095

(51) Int. Cl.
*F16D 69/00*    (2006.01)
(52) U.S. Cl. .............................. 188/265; 188/67; 92/27
(58) Field of Classification Search ................ 188/265, 188/353, 170, 67; 303/89, 71, 9.76; 91/44; 92/24, 26, 27, 28, 14, 25, 63, 130 R
See application file for complete search history.

(56) References Cited

U.S. PATENT DOCUMENTS 3,874,747 A * 4/1975 Case et al. ..................... 303/89

| 3,895,695 | A | | 7/1975 | Hunter ........................ 188/170 |
|---|---|---|---|---|
| 4,116,113 | A | * | 9/1978 | Leclerc ........................... 92/24 |
| 4,159,754 | A | | 7/1979 | Airheart et al. ............ 188/71.8 |
| 4,733,602 | A | * | 3/1988 | Smith et al. ............. 92/21 MR |
| 4,777,867 | A | * | 10/1988 | Severinsson et al. .......... 92/29 |
| 5,937,974 | A | * | 8/1999 | Cathcart et al. ............ 188/203 |
| 5,954,162 | A | | 9/1999 | Feigel et al. ............... 188/72.6 |
| 6,854,570 | B1 | * | 2/2005 | Connell ....................... 188/33 |

FOREIGN PATENT DOCUMENTS

| EP | 0 913 304 A2 | 5/1999 |
|---|---|---|
| WO | WO 91/06458 | 5/1991 |
| WO | WO 2004/005099 A1 * | 1/2004 |

* cited by examiner

*Primary Examiner*—James McClellan
*Assistant Examiner*—Mariano Sy
(74) *Attorney, Agent, or Firm*—St. Onge Steward Johnston & Reens LLC (57) ABSTRACT

The present invention concerns a parking lock for combination with a service brake actuator for a vehicle, preferably a heavy road vehicle. The service brake actuator comprises a fluid actuated piston having a piston rod. The parking lock surrounds the piston rod of the service brake. The parking comprises a pneumatically or hydraulically actuated locking The parking lock has a locking mechanism and an actuating mechanism. The piston rod is free to move in axial, radial and angular directions in relation to the locking mechanism.

18 Claims, 6 Drawing Sheets

PARK LOCK ACTIVATED BY FLUID

This application is a continuation of pending International Patent Application PCT/SE2003/001093 filed on Jun. 26, 2003 which designates the United States and claims priority from Swedish Patent Application No. 0202095-6 filed on Jul. 4, 2002.

FIELD OF THE INVENTION

The present invention concerns a parking lock for combination with a service brake actuator for a vehicle, preferably a heavy road vehicle. The service brake actuator comprises a fluid actuated piston having a piston rod.

BACKGROUND OF THE INVENTION

Park braking of a vehicle may be performed by means of a parking lock, integrated in the service brake actuator to form a unit therewith. Such a unit is known for use on trucks and buses. As is well known in the art, the parking brake may for example be a so-called spring brake actuator or an actuator with fluid actuation. The fluid normally used on heavy road vehicles is compressed air, but hydraulic fluid may equally well be utilized.

A special type of parking lock is the so-called lock actuator, with which the present invention is concerned. The function of a lock actuator is to lock the service brake actuator or parts thereof in an applied condition, in such a way that the service brake actuator will stay locked even in the absence of any fluid pressure. Thus, a parking brake is obtained.

SUMMARY OF THE INVENTION

The parking lock according to the present invention fulfils different requirements with regard to simple and reliable design, space requirement and excellent manoeuvrability. This is achieved according to the invention by a parking lock surrounding a piston rod of a service brake actuator. The parking lock comprises a number of jaws or other locking means moveable in a radial direction.

The locking means of the parking lock are moved in and out of engagement with the piston rod by means of fluidly activated parts, i.e. pneumatically or hydraulically activated parts, and a number of springs acting in a direction to urge the locking means away from or towards the piston rod.

By means of the parking lock the brakes of the vehicle may be locked in an actuated position, e.g. in that grooves of the piston rod and jaws are engaged with each other. The reaction force of the brake keeps up said engagement even when the service brake actuator is deactivated. Thus, it could be said that the parking lock includes a self-locking locking means. A spring, a pressurised chamber or the like in the brake actuator urges the brake actuator piston to resume a start position. To release the parking lock the service brake actuator has to apply a force on the piston rod, having a magnitude being enough to unload the self-locking engagement between the piston rod and the jaws or other locking means.

The parking lock comprises in principal a locking mechanism and an actuating mechanism. The piston rod for brake actuation is free to move in axial, radial and angular directions in relation to the locking mechanism. The locking mechanism is formed of a locking sleeve and further parts received on or in connection with the locking sleeve.

BRIEF DESCRIPTION OF THE DRAWINGS

The invention will be described further below by way of an example and with reference to the drawings below. In the drawings.

DETAILED DESCRIPTION OF PREFERRED EMBODIMENTS

In this description, expressions like "right", "left", "upper", "lower" and other expressions concerning directions are with reference to the FIGS. being referred to. A person skilled in the art realises that in use the different parts may have other orientations. The expressions "axial", "radial" and similar expressions are with reference to a central axis of the parking lock. The parking lock according to the invention is received on a brake caliper (not shown). The parking lock is fixed to the caliper by means of screws, or any other suitable fastening means. As indicated in FIGS. 1, 2, 4 and 5 the parking lock is also fixed to a service brake actuator 18.

The service brake actuator 18 is conventional and is only briefly described here. The exact design of the service brake actuator forms no part of the present invention. In a housing comprising a lower part 19 and a cover part 20 there is a piston 22 and a piston rod 2, from which a pushing brake force may be delivered to further, not shown brake elements. Such brake elements may be part of a compressed air brake system for a heavy road vehicle, such as a truck or a bus. Normally, the piston rod 2 acts on a lever (not shown).

In the shown case the service brake actuator 18 is of the diaphragm type, which means that a diaphragm 21 in contact with the piston 22 is clamped between the two housing parts 19, 20. Compressed air can be admitted to a service brake chamber at the diaphragm 21 through an inlet (not shown).

A piston return spring 23 is arranged between the piston 22 and the lower housing part 19. The main purpose of said piston return spring 23 is to bring the diaphragm 21 back to its starting position. A bellows 24 may be arranged between the piston rod 2 and the lower housing part 19 protecting the interior of the parking lock.

Figure 1:
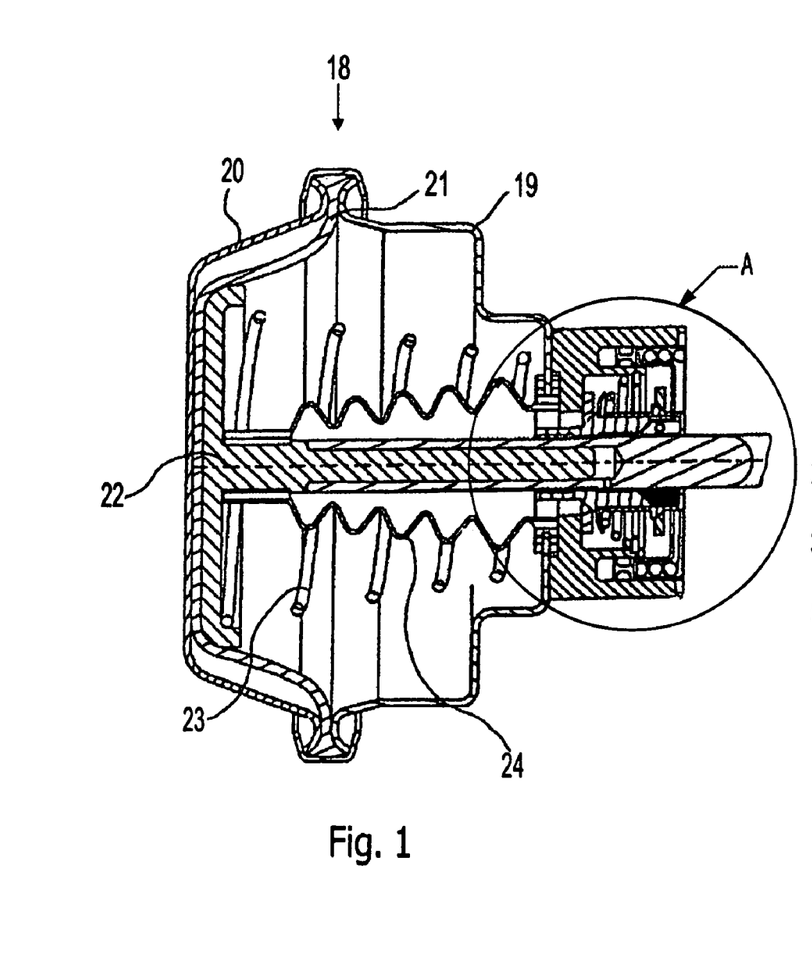
FIG. 1 is a cross-sectional view of a service brake including a parking lock according to the present invention in an inactivated position.

At the admission of compressed air through the inlet the diaphragm 21, the piston 22 and thus the piston rod 2 will be pushed to the right as shown in FIG. 1 for accomplishing a brake actuation in a way well known in the art. A return stroke, when the compressed air pressure is again decreased, is brought about by the reaction force of the brake.

The parking lock of FIGS. 1, 1a, 2 and 2a comprises an outer housing 1, a locking sleeve 5, two springs 4, 9, an operating body 6, a number of jaws 35, an operating sleeve 14, an operating washer 16, a piston 7, a cap 12, bearings 17, a chamber A and a number of further washers. The jaws 35 are received in the locking sleeve 5, with the operating sleeve 14 placed over the jaws 35. One of the springs is an inner spring 4 placed between two locking washers received on the locking sleeve 5 and the housing 1, respectively. The other, outer spring 9 is placed between a flange of the operating body 6 and the cap 12.

The parking lock is formed of a locking mechanism and an actuation means 6, 7, 9. The locking mechanism comprises the locking sleeve 5 and different parts received on or in connection with the locking sleeve 5. The piston rod 2 is free to move in axial, radial and angular directions in relation to the locking mechanism.

The outer spring 9 will be compressed in that the piston 7 and the operating body 6 are pressed to the right (as seen in the FIGS.), when the chamber A is exposed to a pressure sufficient to overcome the force of the spring 9. The chamber A is defined by an annular recess, formed in the housing 1 and the piston 7. The piston 7 is received in the recess with seals 8 in contact with the walls of the recess. The piston 7 is free to move axially in the recess.

The locking sleeve 5, which is received on the piston rod 2 by means of plain bearings 17, is pressed against the housing 1 by the inner spring 4, via a washer 13. Said washer 13 has a spherical connection with the locking sleeve 5 and may move in a radial direction in relation to the housing 1. The operating sleeve 14 may be displaced in an axial direction on the locking sleeve 5 and is spherically connected to the operating washer 16. The function of the spherical connections is to assist in taking up any radial and angular movement caused by the lever (not shown) of the brake. The movement of the lever is rotational and this movement is transformed to a radial movement for the locking sleeve 5. The operating sleeve 14 acts on the jaws 35 by means of the outer end of the sleeve 14 forming a flange. Said outer end of the locking sleeve 14 covers part of the jaws 35.

Figure 1A:
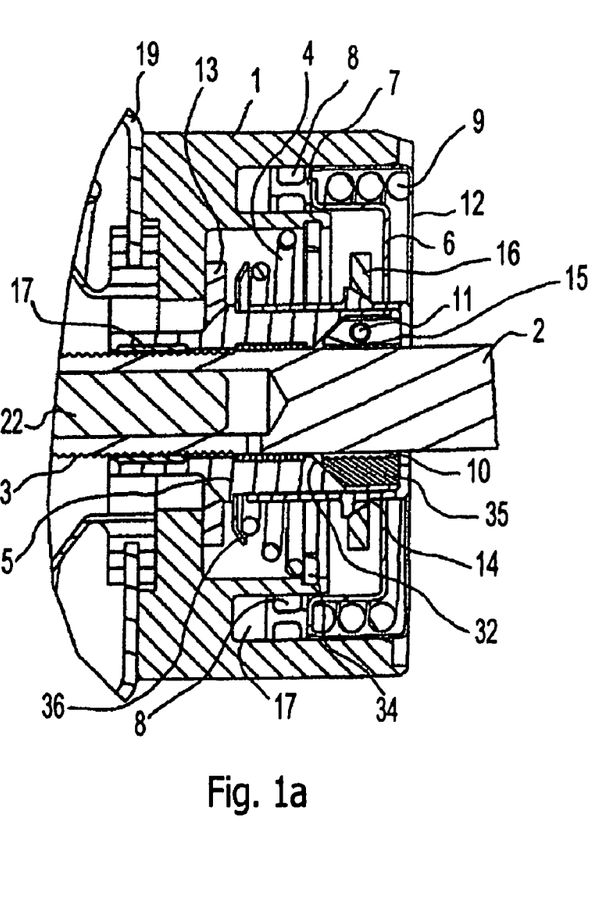
FIG. 1a is an enlarged cross-sectional view of the part marked A in FIG. 1.
Figure 2:
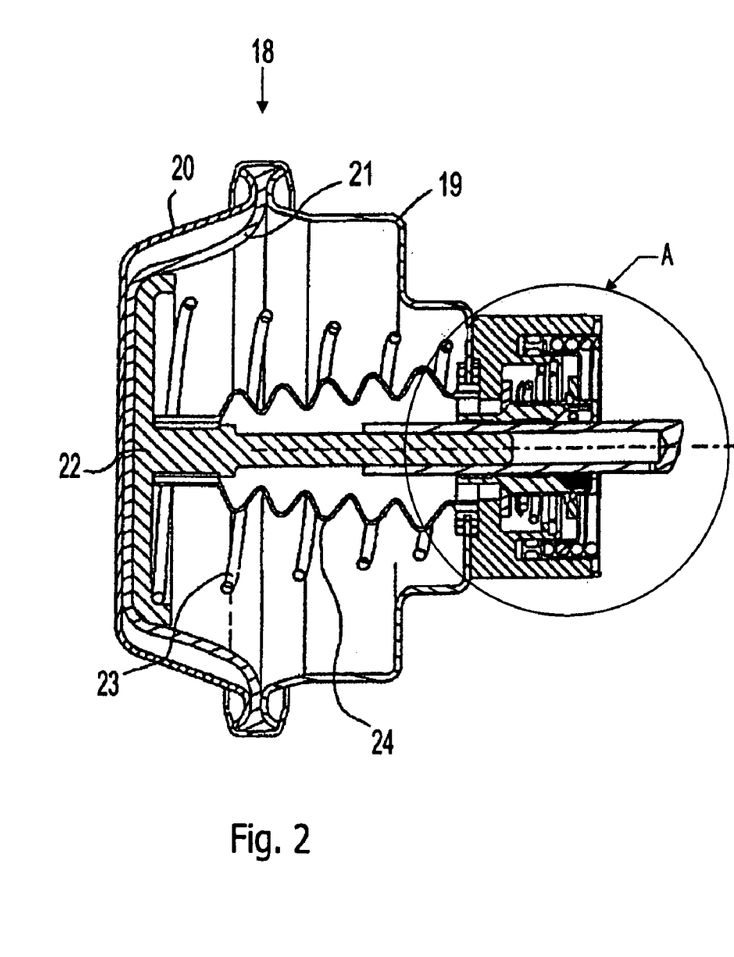
FIGS. 2 and 2a are cross-sectional views corresponding to FIGS. 1 and 1a with the parking lock in a locking position.
Figure 2A:
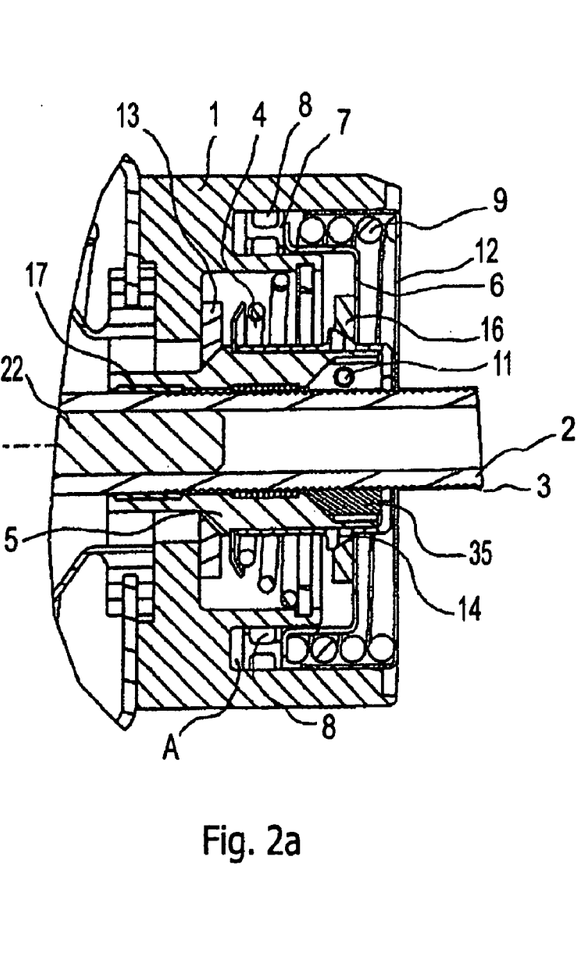

The function of the embodiment of FIGS. 1 to 2*a* is as follows. During normal operation the chamber A is constantly exposed to a positive pressure, which keeps the parking lock inactive. Normal service braking may be performed without influence of the parking lock mechanism. This operational position of the parking lock is shown in FIG. 1*a*.

When the parking lock is to be applied, the service brake is first drawn to the desired parking lock force. The positive pressure in chamber A is then relived, whereby the piston 7 and the operating body 6 are pressed to the left, by means of the outer spring 9. After a short distance also the operating sleeve 14 is brought along by means of the operating washer 16, whereby the jaws 35 are forced into contact with the piston rod 2. When the pressure of the service brake is relived the braking force is kept by the parking lock mechanism. When the pressure is relived the piston 22 of the service brake mechanism will be pressed to the left by the spring 23, at the same time as the piston rod 2 is locked by the parking lock mechanism. This operation position of the parking lock is shown in FIG. 2*a*. As shown in FIG. 2*a* the locking of the piston rod 2 is accomplished by means of contact between grooves 3 and 10 of the piston rod 2 and jaws 35, respectively. The engagement between the grooves 3, 10 of the piston rod 2 and the jaws 35 is a self-locking engagement supported by the reaction force of the brake. In one embodiment (not shown) the grooves 3, 10 have the form of threads.

To deactivate the parking locK, the service brake actuator 18 is actuated with a braking force exceeding the braking force of the parking lock and the chamber A is pressurised. As a result, the grooves 10 of the jaws 35 will be released from the grooves 3 of the piston rod 2. The jaws 35 will then be urged radially outwards by means of the return springs 11 arranged between adjacent jaws 35.

Figure 3:
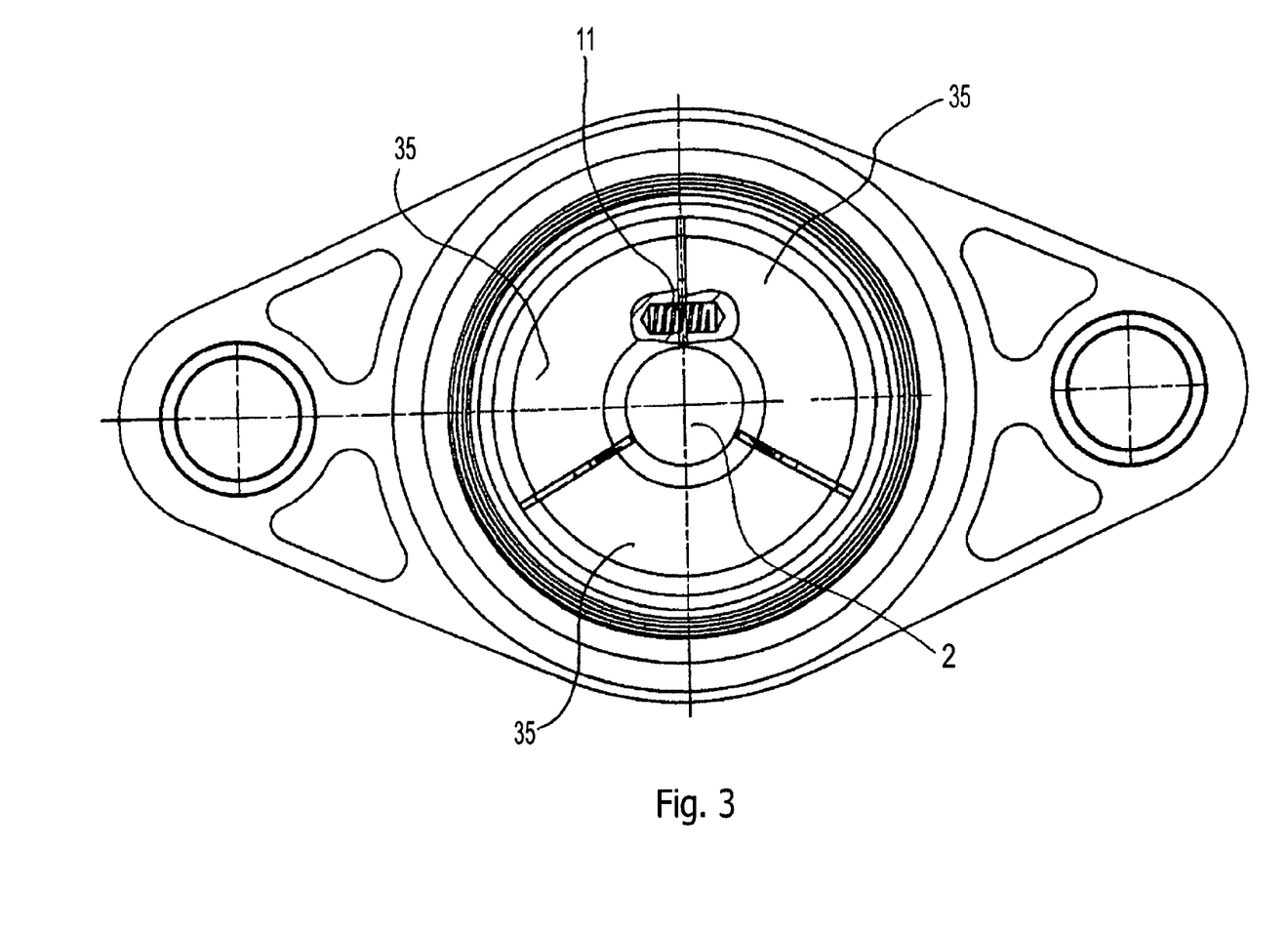
FIG. 3 is a plan view of the parking lock.

In FIG. 3 the function of the jaws 35 is shown schematically. The jaws 35 are received between the locking sleeve 5 and the operating sleeve 14 in the embodiment of FIGS. 1 and 2. The piston rod 2 from the service brake actuator 18 goes centrally through the parking lock. The jaws 35 encircle the piston rod 2 in the parking lock.

The parking lock is slidably received on the piston rod 2 by means of plain bearings 17 or the like. In another embodiment (not shown) there are no bearings but the parking lock is slidably received directly on the piston rod 2. In this case the material and surfaces of the parking lock and the piston rod may be adapted to make the sliding possible.

In the shown embodiment the parking lock comprises three jaws 35, which are equally distributed to together form a ring in plan view. In other embodiments the number of jaws 35 vary. Preferably 3 to 6 jaws 35 are used. The jaws 35 are urged radially outwards by means of jaw return springs 11 placed between adjacent jaws 35. In an alternative embodiment one single, annular pressure spring placed in a groove (not shown) urges the jaws 35 outwardly. The jaws 35 together form a conical surface 15, which is in contact with a conical surface 32 of the locking sleeve 5. Movement between the jaws 35 and the locking sleeve 5 follows said conical surfaces 15, 32.

A person skilled in the art realises that the jaws 35 may be replaced by any other locking means capable of fulfilling the same function. Such other locking means may include but are not limited to balls or rollers wedged between the locking sleeve 5 and the piston rod 2.

The embodiment of FIGS. 4, 4*a*, 5 and 5*a* will now be described briefly. In this embodiment the service brake actuator 18 is slightly modified, compared to the other shown embodiments. Thus, in this embodiment a diaphragm 28 is acting on a piston 26. A cup spring 27, urging the piston 26 to the right, is kept compressed in that the piston 26 and a piston washer 25 are pressed to the left, by a positive pressure in a chamber C. The piston 26 acts on the cup spring 27 by means of a surface 26*a*. When the cup spring 27 is fully compressed the piston 26 will abut the cup spring 27 at a surface 26*b*. The cup spring 27 is fixed to the housing 19 of the service brake actuator 18 by means of a locking ring 41. In other respects the service brake actuator 18 of FIGS. 4 to 5*a* functions in the same way as described above for the previous embodiment.

The parking lock is formed of a locking mechanism and an actuation means 6, 25, 26, 27. The locking mechanism comprises the locking sleeve 5 and different parts received on or in connection with the locking sleeve 5. The piston rod 2 is free to move in axial, radial and angular directions in relation to the locking mechanism.

The locking sleeve 5 is received on the piston rod 2 by means of plain bearings 17. The locking sleeve 5 is pressed against the piston washer 25, by means of a washer 13. The washer 13 has a spherical connection to the locking sleeve 5 and may be displaced radially in relation to the piston washer 25. An operating body 6 receives two springs, one inner spring 4 and one operating spring 29. The inner spring 4 is received between an inner end of the operating body 6 and a locking washer 36. An operating sleeve 30 is received axially displaceable on the locking sleeve 5. The operating sleeve 30 acts on the jaws 35 by means of the outer end of the operating sleeve 30 forming a flange. Said flange covers parts of the jaws 35. The operating sleeve 30 is furnished with two locking rings 31, between which the biased operating spring 29 and a washer 33 act.

One end of a diaphragm 28 is fixed to the outside of the operating body 6, by means of a cap 37. The end of the diaphragm 28 is fixed to the operating body 6 at the outer (right according to the FIGS.) end of the park lock, between the operating body 6 and the cap 37. The other end of the diaphragm 28 is fixed at the service brake actuator 18 by means of the cap 37. The chamber C is formed in the space between the diaphragm 28 and the cap 37.

Figure 4:
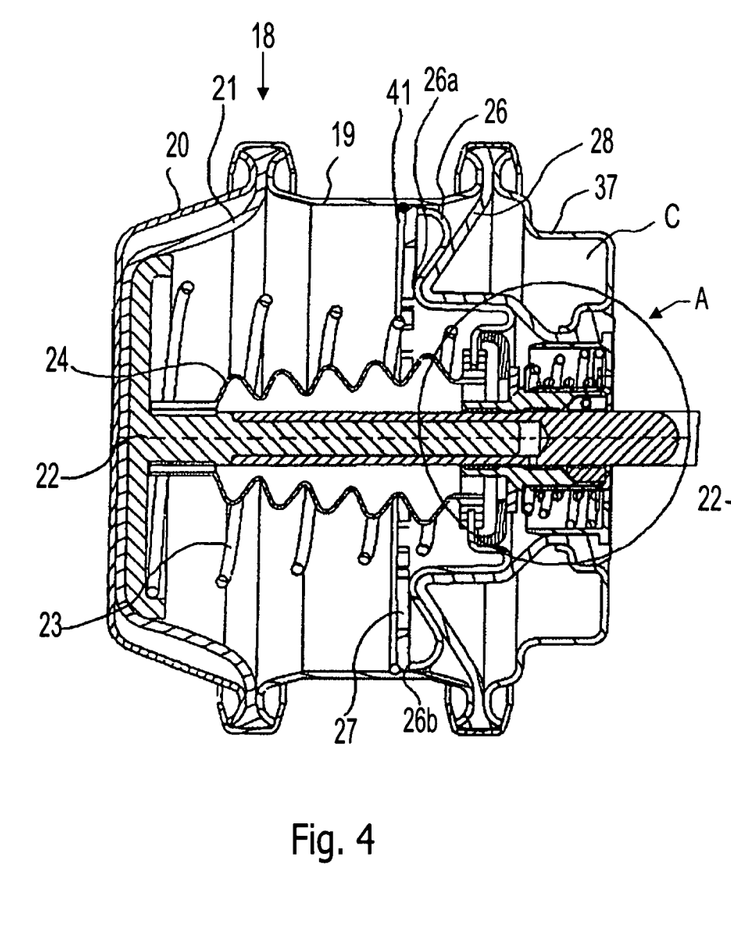
FIGS. 4 and 4a are cross sectional views corresponding to FIGS. 1 and 1a of an alternative embodiment of the present invention with the parking lock in an inactivated position.
Figure 4A:
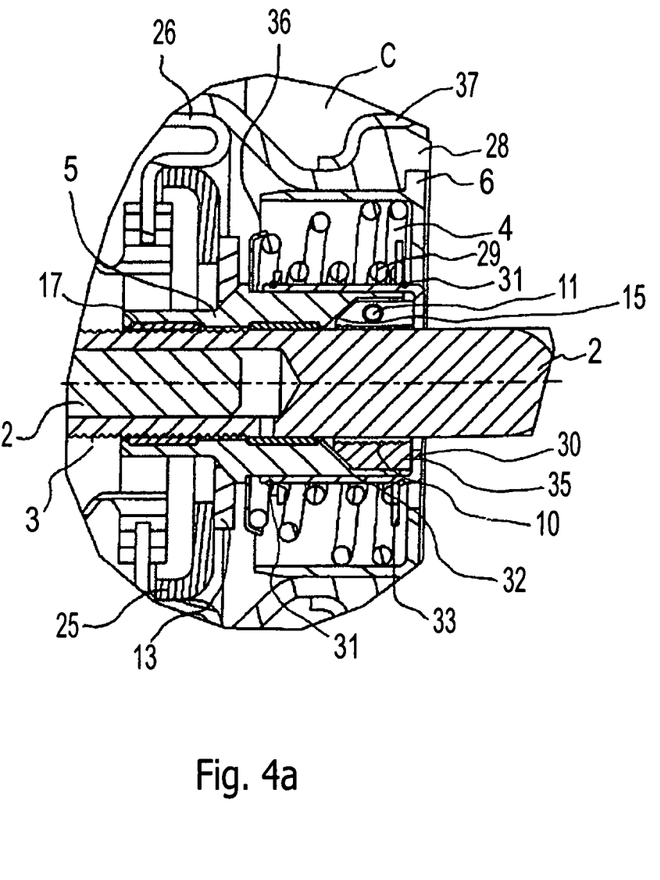

During normal operation, i.e. when the parking lock is not to be applied, the chamber C is exposed to a constant positive pressure. The positive pressure of chamber C keeps the parking lock inactive and the service brake may be used without influence of the parking lock mechanism.

Figure 5:
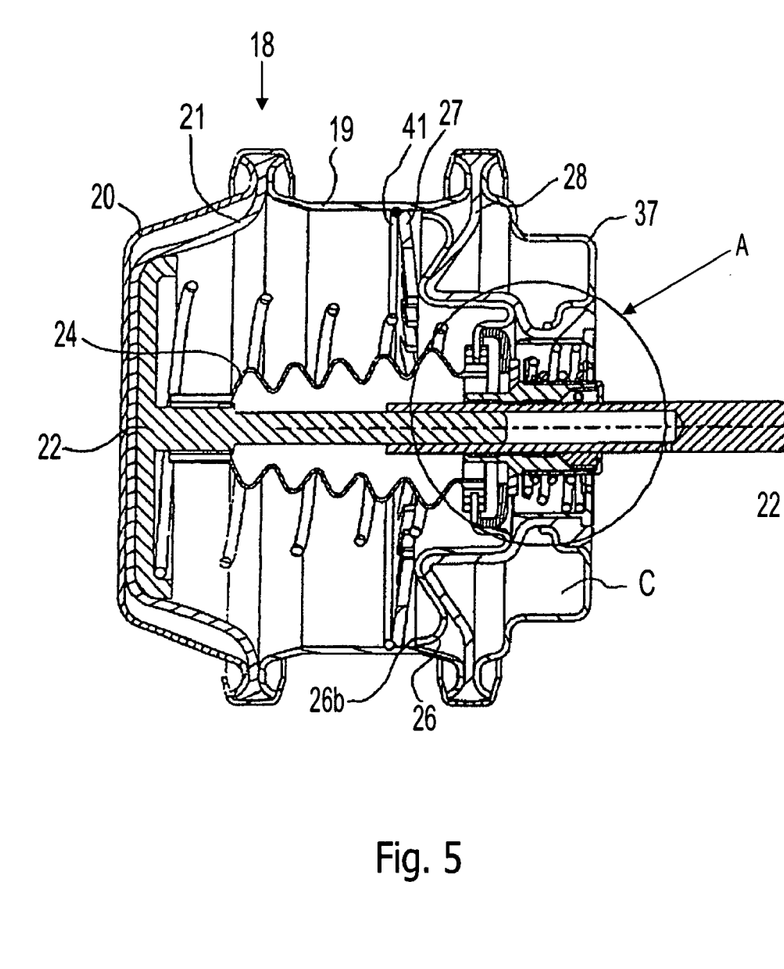
FIGS. 5 and 5a are cross sectional views of the embodiment of FIGS. 4 and 4a with the parking lock in a locking position.
Figure 5A:
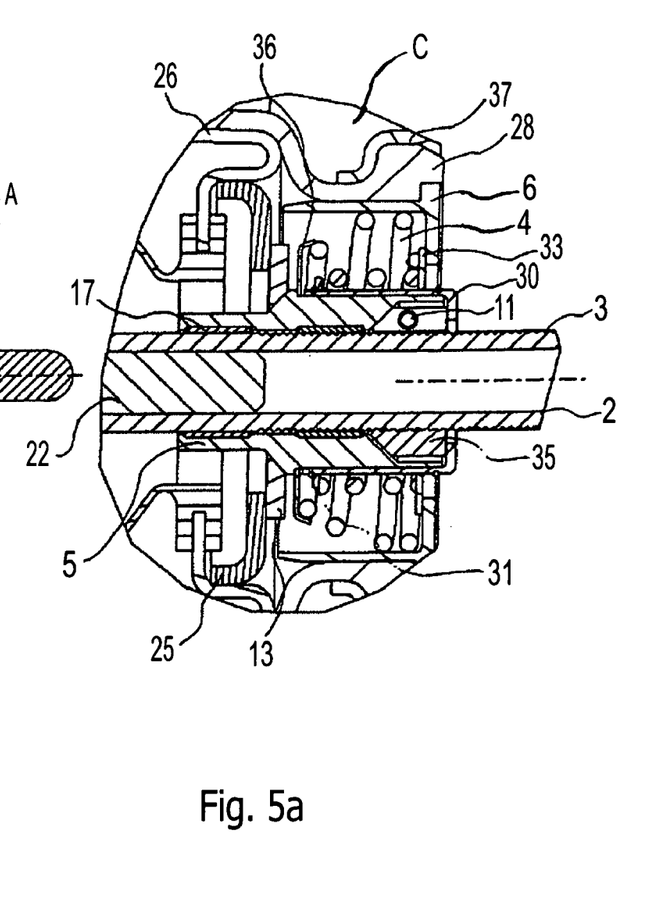

To activate the parking lock the service brake is first drawn to a desired parking lock force. Then the positive pressure of chamber C is relived, which means that the piston 26 and piston washer 25 are pressed to the right by means of the cup spring 27. The locking sleeve 5 is brought along in said movement to the right. After a short distance the washer 33 will abut the operating body 6, forcing the jaws 35 into contact with the piston rod 2, by means of the operating spring 29. This operating position is indicated in FIG. 5a. When the service brake pressure is relived, the brake force is kept by means of the parking lock mechanism and the cup spring 27. In this case the cup spring 27 will be in series with the parking lock force and will reduce variations of the parking lock force. Such variations are caused e.g. by the cooling of the brake disc.

To inactivate the parking lock the service brake actuator 18 is actuated with a braking force exceeding the braking force of the parking lock and chamber C is pressurised. Hereby, the grooves 10 of the jaws 35 will be released from the grooves 3 of the piston rod 2. The jaws 35 will then be urged radially outwards by means of the return springs 11 arranged between adjacent jaws 35, as indicated in FIG. 4a.

Figure 6:
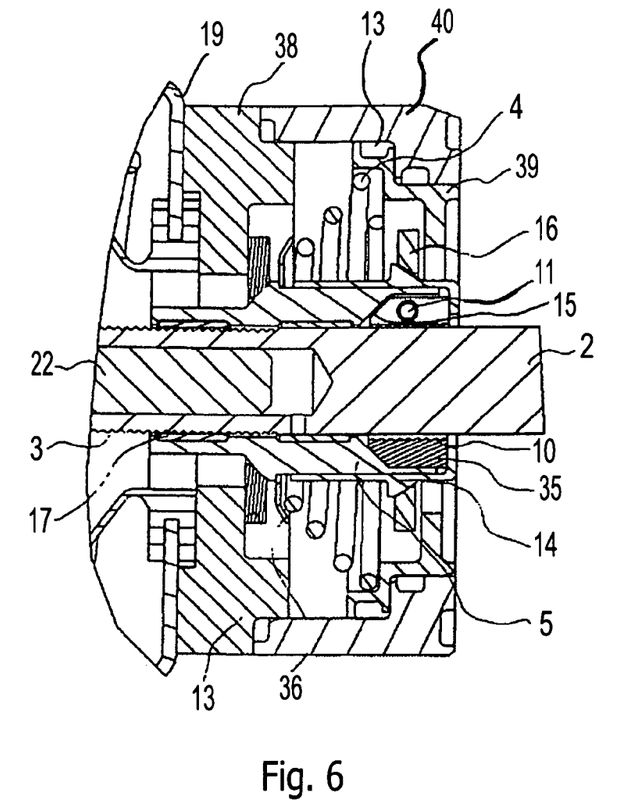
FIGS. 6 and 7 are cross-sectional views of a further embodiment of a parking lock, using the same type of service brake as in the embodiment of FIGS. 1 and 2 and showing an inactivated and locking position, respectively.
Figure 7:
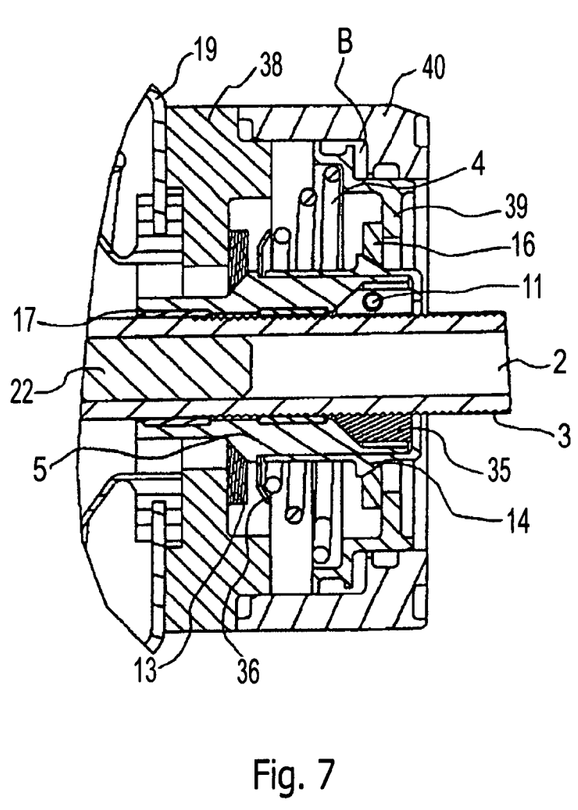

In the embodiment of FIGS. 6 and 7 the service brake actuator 18 has the same general design as for the embodiment of FIGS. 1, 1a, 2 and 2a. Thus, the service brake actuator 18 will not be described once again here.

The parking lock of FIGS. 6 and 7 comprises an outer housing 39, a mounting ring 38, a locking sleeve 5, a spring 4, a number of jaws 35, an operating sleeve 14, an operating washer 16, a piston 39, a locking washer 36, a further washer 13 and a chamber B.

The parking lock is formed of a locking mechanism and an actuation means 39. The locking mechanism comprises the locking sleeve 5 and different parts received on or in connection with the locking sleeve 5. The piston rod 2 is free to move in axial, radial and angular directions in relation to the locking mechanism.

The parking lock is received in an outer housing 40, which housing 40 is attached to the service brake actuator 18 by means of a mounting ring 38. The jaws 35 are received in the locking sleeve 5, with the operating sleeve 14 placed over the jaws 35. The spring 4 is placed between the piston 39 and the locking washer 36. The locking washer 36 is held at a recess on the outer side of the locking sleeve 5.

When a pressure, of a magnitude to overcome the force of the spring 4, is introduced into the chamber B, the piston 39 will go to the left as viewed in FIGS. 6 and 7. The chamber B is defined by the inner (left as viewed in the Figs.) end of the piston 39 and the outer housing 40, to the right of said inner end of the piston 39. The outer end of the piston 39 is received in a central opening of the outer housing 40. The piston 39 is free to move axially in the opening of the outer housing 40. Normally, a seal is placed between the opening of the outer housing 40 and the piston 39. The inner spring 4 urges the piston 39 against the outer housing 40.

The operating washer 16 is received axially slideable on a spherical surface of the operating sleeve 14. The inclination of the contact surfaces of the operating washer 16 and the operating sleeve 14 is such that washer 16 is free to move to the right in relation to the operating sleeve 14, as viewed in the Figs. A washer 13 is placed between the mounting ring 38 and the locking sleeve 5. The washer 13 has a spherical connection with the locking sleeve 5 and may move in a radial direction in relation to the mounting ring 38.

The function of the embodiment of FIGS. 6 and 7 is as follows. During normal operation the chamber B is not pressurised, i.e. the spring 4 will hold the piston 39 against the inner housing 40. The spring 4 constantly keeps the locking sleeve 5 in contact with the washer 13 and said washer 13 in contact with the mounting ring 38. The washer 13 and the operating washer 16 are spherically pivoted. This will keep the parking lock inactivated, as indicated in FIG. 6. Normal service braking may be performed without influence of the parking lock mechanism.

When the parking lock is to be applied, the service brake is first drawn to the desired parking lock force. The chamber B is then pressurised to a pressure high enough to overcome the force of the inner spring 4. The piston 39 is moved to the left by the pressure of the chamber B. After a short distance the piston 39 will go into contact with the operating washer 16. The operating washer 16 will move the operating sleeve 14 to the left. When the operating sleeve 14 goes to the left, the jaws 35 will be forced into contact with the piston rod 2. It is grooves 3 and 10 of the piston rod 2 and the jaws 35, respectively, which will go into contact. The jaws 35 are forced into contact with the rod 2 in that the conical surfaces 15 of the jaws 35 will glide on the conical surface 32 of the locking sleeve 5, in the same way as indicated above for the other embodiments. The engagement between the grooves 3, 10 of the piston rod 2 and the jaws 35 is a self-locking engagement supported by the reaction force of the brake. This operating position of the park lock is shown in FIG. 7.

To inactivate the parking lock the service brake actuator 18 is actuated with a braking force exceeding the braking force of the parking lock and the chamber B is depressurised. Hereby, the grooves 10 of the jaws 35 will be released from the grooves 3 of the piston rod 2. The jaws 35 will then be urged radially outwards by means of the return springs 11 arranged between adjacent jaws 35.

1. outer housing
2. piston rod
3. groove
4. inner spring
5. locking sleeve
6. operating body
7. piston
8. seal
9. outer spring
10. groove
11. return spring
12. cap
13. washer
14. operating sleeve
15. conical surface
16. operating washer 17. plain bearing
18. service brake actuator
19. housing part
20. housing part
21. diaphragm
22. piston
23. return spring
24. bellows
25. piston washer
26. piston
26a. surface
26b. surface
27. cup spring
28. diaphragm
29. operating spring
30. operating sleeve
31. locking ring
32. conical surface
33. washer
34. locking washer
35. jaw
36. locking washer
37. cap
38. mounting ring
39. piston
40. outer housing
A. chamber
B. chamber
C. chamber

The invention claimed is:

1. A parking lock for a brake of a vehicle, which surrounds a piston rod of a service brake actuator and comprises:
   a locking means actuated by a fluid, the locking means being self-locking;
   characterized in that the parking lock is pneumatically or hydraulically actuated and comprises a locking sleeve, enclosing a number of locking means, and the locking sleeve is, moveable in a radial direction in the parking lock, and the parking lock has a locking mechanism and an actuating mechanism and that the piston rod is free to move in axial, radial and angular directions in relation to a parking lock housing.

2. The parking lock of claim 1, characterized in that the locking mechanism comprises at least the locking sleeve.

3. The parking lock of claim 2, characterized in that the piston rod is received in a central opening of the parking lock; that the piston rod is axially moveable in relation to the locking sleeve; and that the locking means form a ring surrounding the piston rod.

4. The parking lock of claim 3, characterized in that each locking means has a conical surface for co-operation with a conical surface of the locking sleeve.

5. The parking lock of claim 4, characterized in that the locking means are jaws having grooves on a side turned towards the piston rod and that the piston rod has grooves on an outer periphery and in an area for the parking lock.

6. The parking lock of claim 5, characterized in that the grooves of the piston rod and the jaws, respectively, have the form of threads.

7. The parking lock of claim 6, characterized in that the parking lock comprises three to six jaws and preferably three jaws evenly distributed around the piston rod and that jaw return springs are placed between adjacent jaws to urge the jaws radially outwards.

8. The parking lock of claim 4, characterized in that the locking means are balls or rollers wedged between the locking sleeve and the piston rod.

9. The parking lock of claim 8, characterized in that the piston rod is formed of two parts, which are axially moveable in respect of each other, and whereby one of the parts of the piston rod is free to move axially even if the other part is locked by the parking lock.

10. The parking lock of claim 9, characterized in that a chamber is formed in the parking lock and that a pressure in said chamber acts on a piston, and at least one spring acting in the opposite direction to the force of the piston.

11. The parking lock of claim 10, characterized in that the piston directly or indirectly acts on an operating sleeve, which operating sleeve moves the locking means, which are jaws in an axial direction in relation to the locking sleeve, by means of an outer end of the operating sleeve placed in contact with the jaws.

12. The parking lock of claim 10, characterized in that the pressure of the chamber acts in a direction to keep the parking lock inactivated.

13. The parking lock of claim 12, characterized in that the piston acts on the operating sleeve by means of an operating body and an operating washer.

14. The parking lock of claim 12, characterized in that the piston acts on an operating washer, being in contact with the operating sleeve.

15. The parking lock of claim 10, characterized in that the piston is placed between a cup spring and a diaphragm.

16. The parking lock of claim 10, characterized in that the pressure of the chamber acts in a direction to keep the parking lock activated.

17. The parking lock of claim 15, characterized in that the piston acts on an operating washer being in contact with the operating sleeve.

18. The parking lock of claim 1, characterized in that the locking means and the locking sleeve are received in an operating sleeve.

* * * * *